Dec. 11, 1956 W. S. TOUCHMAN 2,773,381

GASOLINE MILEAGE INDICATOR

Filed Nov. 15, 1952 6 Sheets-Sheet 1

INVENTOR.
William S. Touchman
BY
Moore, Olson & Trexler
attys.

Dec. 11, 1956 W. S. TOUCHMAN 2,773,381

GASOLINE MILEAGE INDICATOR

Filed Nov. 15, 1952 6 Sheets-Sheet 2

INVENTOR.
William S. Touchman
BY
Moore, Olson & Trexler
attys.

GASOLINE MILEAGE INDICATOR

Filed Nov. 15, 1952 6 Sheets-Sheet 3

INVENTOR.
William S. Touchman
BY
Moore, Olson & Trexler
Attys.

Dec. 11, 1956

W. S. TOUCHMAN 2,773,381

GASOLINE MILEAGE INDICATOR

Filed Nov. 15, 1952

6 Sheets-Sheet 4

INVENTOR.
William S. Touchman
BY
Moore, Olson & Trexler
Attys.

GASOLINE MILEAGE INDICATOR

Filed Nov. 15, 1952 6 Sheets-Sheet 5

INVENTOR.
William S. Touchman
BY
Moore, Olson & Trexler
Attys.

GASOLINE MILEAGE INDICATOR

Filed Nov. 15, 1952 6 Sheets-Sheet 6

INVENTOR.
William S. Touchman
BY
Moore, Olson & Trexler
attys.

United States Patent Office 2,773,381

Patented Dec. 11, 1956

2,773,381

GASOLINE MILEAGE INDICATOR

William S. Touchman, Yellow Springs, Ohio, assignor to Perc C. Sorenson and Lee Jewell, both of Wauwatosa, Wis.

Application November 15, 1952, Serial No. 320,760

12 Claims. (Cl. 73—114)

The present invention relates to an improved engine efficiency meter, and more particularly to an improved apparatus for indicating the amount of fuel used for the distance travelled for internal combustion engine driven vehicles, such as automobiles.

In the past, numerous devices have been proposed for indicating the fuel consumption of automobiles in miles per gallon, but these devices have been found to be subject to various disadvantages. Many of the devices have not been practical from a commercial standpoint either because of lack of accuracy or because they are difficult to manufacture. Another disadvantage of some of the prior art devices is that they incorporate a dial having gradations spaced at varying increments so that they are difficult to read. Still another disadvantage in the prior art devices has been that in some cases because of their structure, they are not readily suitable for installation in the conventional dashboard of an automobile.

It is, therefore, an object of the present invention to provide a novel engine efficiency meter or miles per gallon indicator which has greatly improved accuracy, which responds quickly to varying conditions of fuel consumption and speeds, and which gives a steady reading without hunting regardless of varying operating conditions and driving conditions, such as irregular roads which subject the automobile to severe shocks.

Another object of the present invention is to provide a novel miles per gallon indicator having the above described characteristics which may be readily manufactured and which is compact so that it may be easily installed in the conventional dashboard of an automobile.

A more specific object of the present invention is to provide a miles per gallon indicator of the above described type which includes means for transforming fluid pressures which are responsive to the fuel flow to the engine to linear forces, means for providing opposed linear forces responsive to the engine speed, both of which means are operatively connected with a movable indicator and combined in a compact unit which may be easily installed in a dashboard.

Still another object of the present invention is to provide a miles per gallon indicator of the above described type which incorporates a novel fluid pressure responsive device which is sealed in a novel manner to eliminate all possibility of gasoline leaks in the dashboard unit, whereby gasoline may be safely conveyed to the dashboard unit without creating a fire hazard.

Another object of the present invention is to provide a novel miles per gallon indicator of the above described type having a novel linkage, whereby the pressure responsive device in the dashboard unit may be operated to prime the device without actuating the speed responsive device or the indicator mechanism.

While the present invention will be described for use primarily with an automobile, it will be obvious that the novel apparatus of this invention may be used with various types of vehicles powered by internal combustion engines or other fluid driven engines. For example, the device may be applied to trucks and busses, as well as automobiles, and also to various internal combustion engine driven boats or aircraft.

Other objects and advantages of the present invention will be apparent from the following description and the accompanying drawings, wherein.

Figure 1:
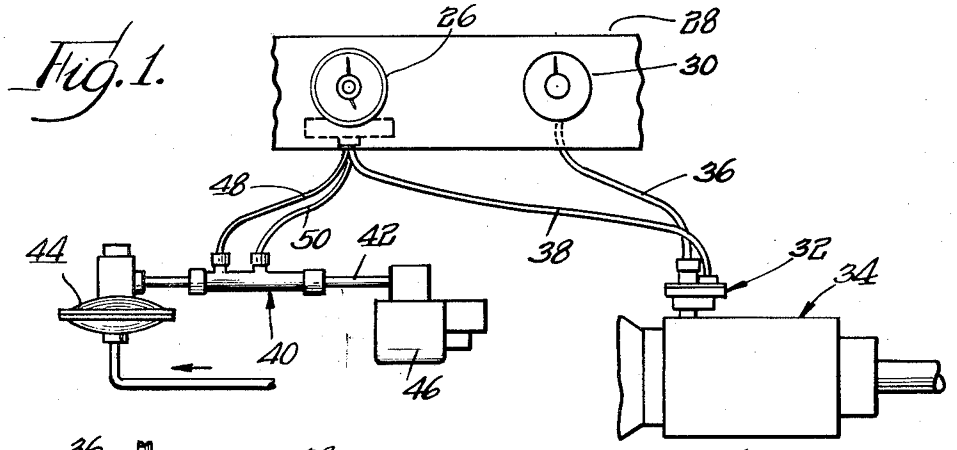
Fig. 1 is a schematic view, illustrating the application of the present invention to an automobile.

Referring now more specifically to the drawings, wherein like parts are designated by the same numerals throughout the various figures, one use for the novel engine efficiency meter of this invention is illustrated schematically in Fig. 1. The dashboard unit 26 may be secured in the conventional dashboard 28 alongside the usual speedometer 30 or at any other convenient point. An adapter 32 is connected to the conventional automobile transmission 34 to which the flexible drive shaft 36 may be connected for driving speedometer 30 in the usual manner, and a second flexible drive shaft 38 may be connected for driving the speed responsive rotor mechanism in the dashboard unit 26 of the miles per gallon indicating apparatus of this invention.

The fuel flow is indicated by a Venturi 40 which is inserted within the fuel line 42 between the fuel pump 44 and the carburetor 46. The carburetor 46 may be of any conventional float type which permits an even and continuous flow of the fuel from the pump through the carburetor and into the engine. A pair of conduits 48 and 50 convey the fuel at different pressures from the Venturi to the pressure responsive device within the dashboard unit 26.

Figure 2:
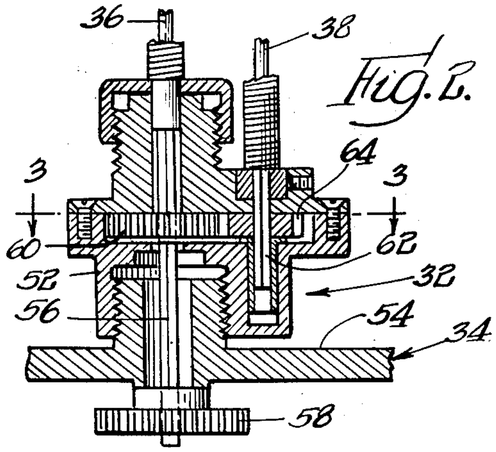
Fig. 2 is a vertical cross section taken through the novel adapter utilized in this invention for connecting the speed responsive mechanism of this device with a conventional automobile transmission.
Figure 3:
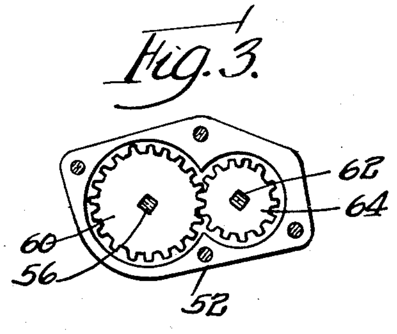
Fig. 3 is a fragmentary horizontal cross section taken along line 3—3 in Fig. 2.

Referring now more specifically to Figs. 2 and 3, the adapter unit 32 includes a housing 52 which may be mounted on the housing 54 of the transmission 34 in the usual manner. A drive shaft 56 extends through the housing 52 and into the transmission housing, where it is connected with a gear 58, which is driven from the conventional transmission gearing. At its upper end, the drive shaft 56 is connected in the usual manner to the flexible drive shaft 36 which is connected to the conventional speedometer. A gear 60 is connected to an intermediate portion of the drive shaft 56 and is driven thereby. Journaled within the housing 52 is a second drive shaft 62, which carries a second gear 64. At its upper end, the shaft 62 is connected with the flexible drive shaft 38, which drives the speed responsive rotor element of the dashboard unit 26. As shown best in Fig. 3, the gear 60 is larger than the gear 64 so that the drive shaft 62 and the flexible drive shaft 38 are driven at a speed somewhat greater than the engine speed. It is, therefore, seen that at low engine speeds, the rotor mechanism of the dashboard unit 26 will still be driven at a relatively high speed, whereby the accuracy and efficiency of the speed responsive element is maintained at a higher degree, as will be described more fully hereinbelow. It has been found that the preferred gear ratio is such that the rotor mechanism will be driven at a rate of about 1¾ times the engine speed.

Figures 12, 13, 14:
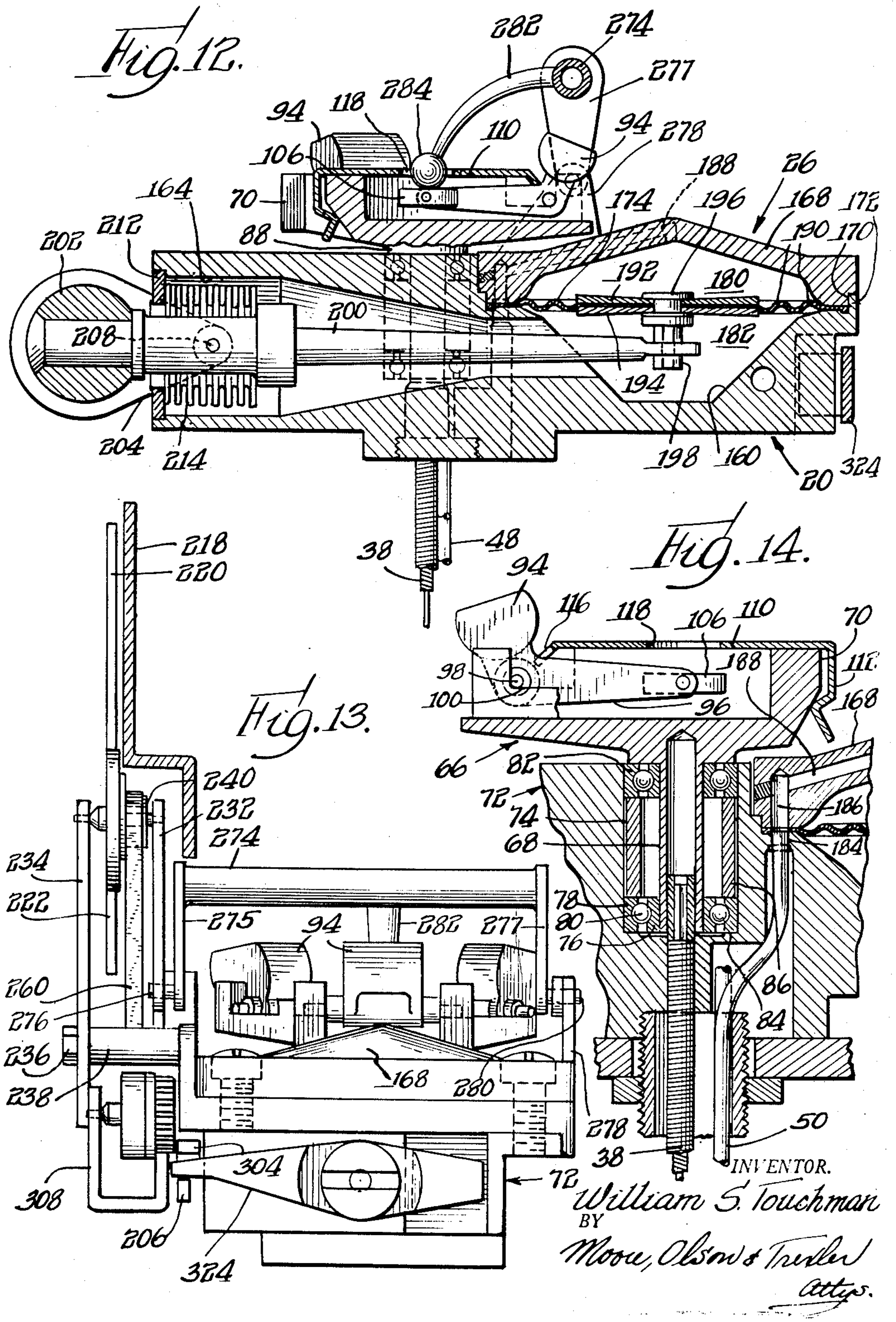
Fig. 12 is a vertical cross section taken along line 12—12 in Fig. 10.
Fig. 13 is an end elevational view of the dashboard unit shown in Fig. 10.
Fig. 14 is an enlarged vertical cross sectional view, showing the engine speed responsive centrifugal rotor in greater detail.
Figures 19, 20, 21, 22, 23, 24:
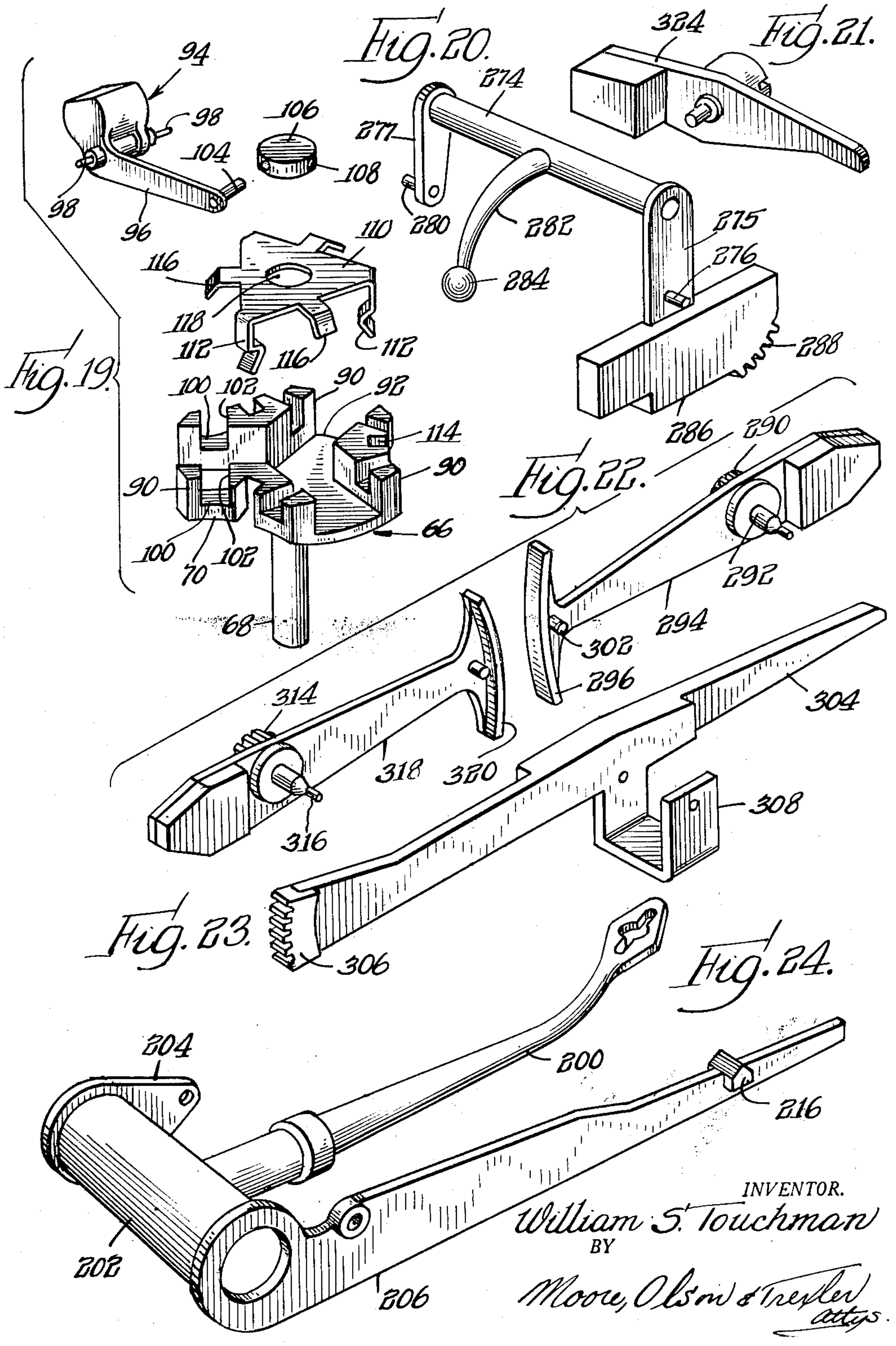
Fig. 19 is an exploded perspective view, showing some of the elements of the speed responsive rotor of this invention.
Fig. 20 is a perspective view, showing one of the linkage elements which is actuated directly from the speed responsive rotor.
Fig. 21 is a perspective view, showing the lever which may be actuated for priming the pressure responsive device.
Figs. 22, 23, and 24 are perspective views, showing various elements of the linkage mechanism of this invention for transmitting forces from the fuel flow responsive and engine speed responsive devices to the indicator.

The rotor mechanism of the present invention includes a rotor 66 having a shank 68 and a head 70 (see Figs. 12, 14, and 19). As shown best in Fig. 14, the shank 68 is hollow in order to receive the connecting end of the flexible drive shaft 38. The drive shaft 38 may be secured to the shank 68 in any suitable manner. The rotor is mounted on the body 72 of the dashboard unit 26 in the manner best illustrated in Fig. 14. The body 72 is provided with a recess 74 into which the shank 68 of the rotor extends. The lower end of the shank 68 is retained in position by a ball bearing unit having ball races 76 and 78 and a plurality of bearing balls 80. The upper end of the shank 68 is retained by a similar ball bearing unit 82, which is disposed within the recess 74. The lower ball bearing unit is retained against downward axial displacement by a shoulder 84 formed at the bottom of the recess 74, and the upper ball bearing unit is supported on an annular spacing sleeve 86, which in turn rests on the lower bearing unit. The head 70 of the rotor is provided with an annular shoulder 88, which rests on the upper surface of the bearing unit 82 to restrain the rotor against downward axial displacement. By utilizing ball bearings for mounting the rotor, a very smooth and regular rotary motion is obtainable for the rotor, whereby the accuracy and stability of the indicating device of this invention is greatly improved.

As shown best in Fig. 19, the head 70 of the rotor includes a flat plate having three upstanding lugs 90 spaced evenly about its periphery. The lugs are spaced and formed so as to provide three recesses 92 into which the speed responsive weights 94 may be placed. While only one of the weights 94 is shown in Fig. 19, it is obvious that one weight should be provided for each of the recesses 92. The weights 94 include a relatively light weight lever arm 96 extending forwardly therefrom. An axle 98 extends through the lower end of the weight 94 adjacent the junction between the weight and the arm 96. The weights are mounted on the rotor head by placing them within the recesses 92 with the arms 96 extending towards the center of the head and with the free ends of the axle 98 disposed on the bottom surfaces 100 of the recesses 102 provided in the lugs 90. This position of the weights within the rotor head is best illustrated in Figs. 10, 12, and 14.

Figure 10:
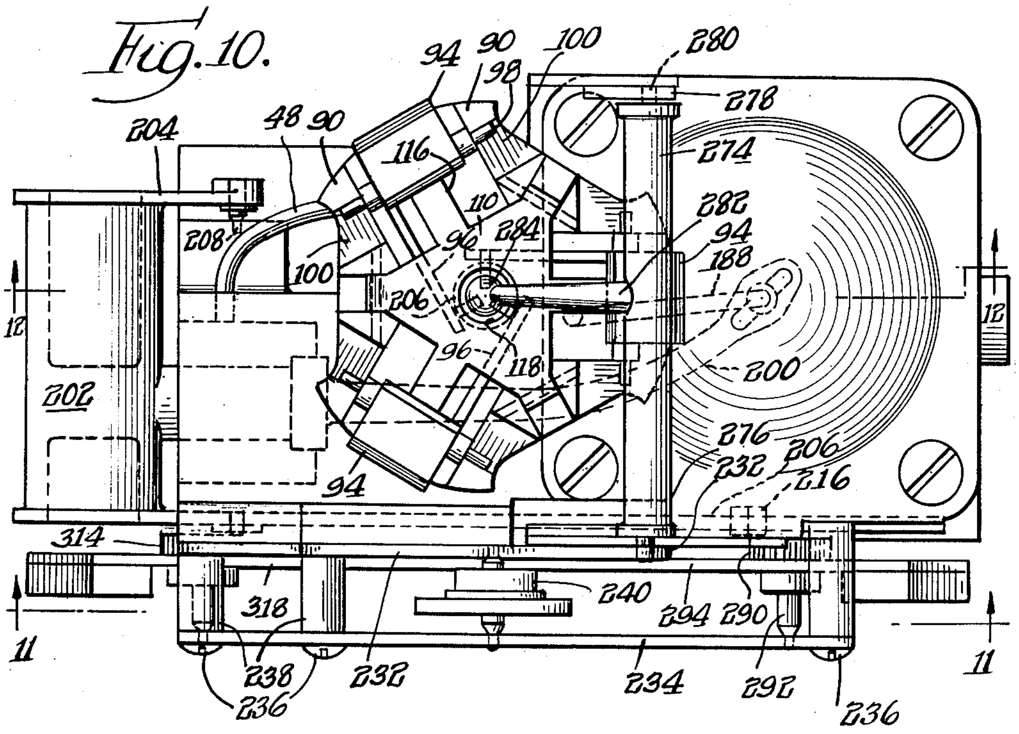
Fig. 10 is a plan view, showing the dashboard unit of the novel miles per gallon indicator of this invention.
Figure 11:
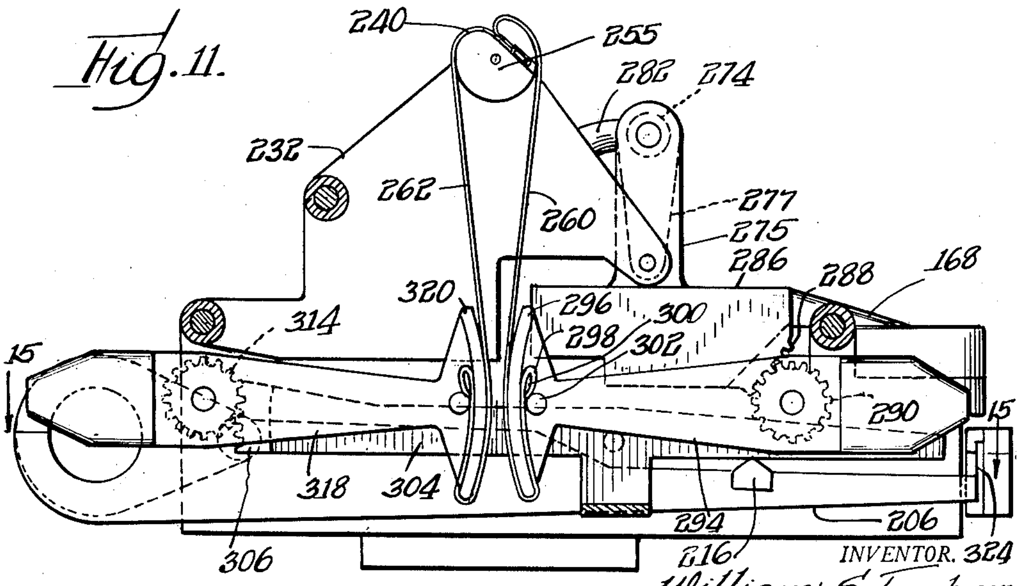
Fig. 11 is a partial vertical cross section taken along line 11—11 in Fig. 10.

It should be noted that the arms 96 extend from one side of the weights and along one side of the recesses 92, as shown best in Figs. 10 and 19. At the outer ends of the arms 96, there is secured a pin 104. A button 106 having three apertures 108 spaced evenly about its periphery is mounted on the ends of the pins 104, as shown in Figs. 10, 12, and 14. By this arrangement, upon tilting movement of the weights 94 under the influence of centrifugal force, the button 106 is raised or lowered by the arms 96. By providing three weights and three arms, the button 106 is prevented from tilting and is always maintained in a substantially horizontal position. As described above, the weights 94 rest with their axles 98 lying freely within the recesses 102 of the lugs 90. This provides a mounting for the weights which has a minimum of frictional resistance, whereby the weights may respond quickly and accurately to any variations in the speed of the rotor. In order to prevent the weights from becoming accidentally dislodged from the recesses, a sheet metal cover 110 is provided. The cover 110 has a plurality of resilient snap fingers 112 which are adapted to be disposed within recesses 114 in the lugs 90, and other fingers 116 which overlie a portion of the weights 94 to prevent them from rising out of the recesses 92. The cover 110 is provided with a central aperture 118 which is in alignment with the button 106 supported by the arms of the weights.

From the above description of the rotor, it is seen that for a given engine speed, the rotor will be driven by the flexible cable 38, whereby the weights tend to assume a horizontal position due to the centrifugal force. This movement of the weights raises the arms 96 and the button 106 with a given force, which force is transmitted to the indicator mechanism, as more fully described hereinbelow. It has been found that any errors due to the changing angularity of the weights 94 with respect to the horizontal as the centrifugal force varies may be reduced to a minimum by constructing the weights 94 and their arms 96 so that the angle between the center line of the weights and the horizontal is initially about 71.5°. Furthermore, by constructing the device so that the maximum travel is about 7°, a minimum error due to variation in position of the weights is obtained.

Figures 4, 5:
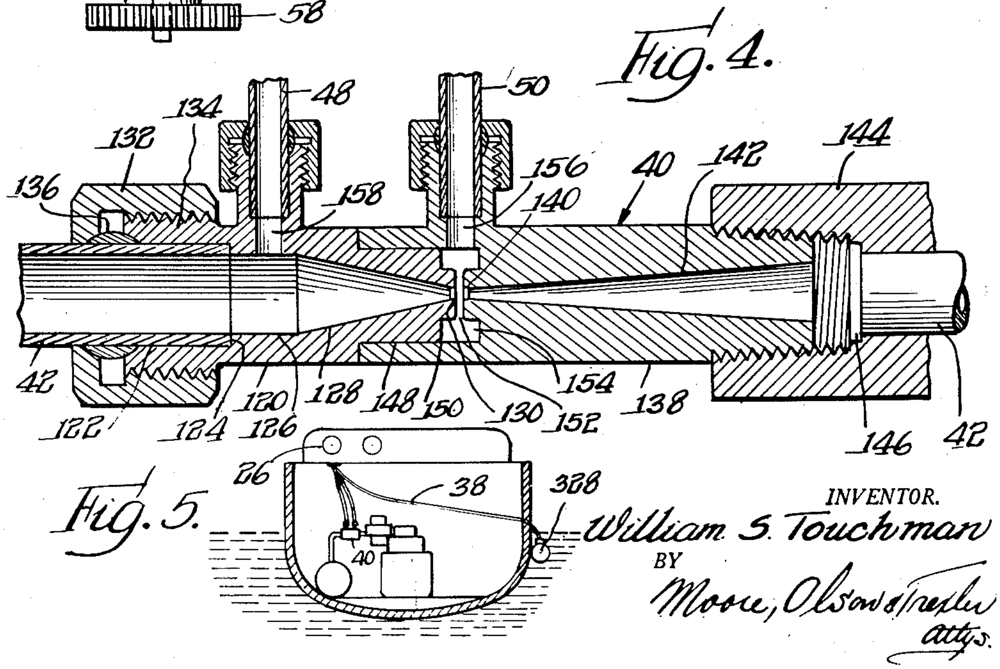
Fig. 4 is a vertical cross section taken through the novel Venturi provided by this invention for assembly in the fuel line of the engine for measuring the fuel flow.
Fig. 5 is a schematic view, showing how the present invention may be applied to a boat.

The improved Venturi 40, which is provided by the present invention is shown in detail in Fig. 4. The Venturi 40 includes an upstream section 120, which is adapted to be connected to one section of the gasoline line 42. As shown in Fig. 4, the Venturi section 120 is provided with a bore 122 into which the end of the fuel line 42 may be inserted. Movement of the fuel line into the bore of the Venturi is limited by an annular shoulder 124 which forms a junction between the bore 122 and a smaller bore 126. The bore 126 preferably has a diameter which is substantially equal to the internal diameter of the fuel line. The bore 126 then merges with a conical bore 128 which terminates in a short cylindrical bore 130 of a relatively small diameter. In order to hold securely the Venturi section 120 along the fuel line, a threaded cap 132 cooperates with external threads 134 on the Venturi section to draw the section tightly against the end of the fuel line. The cap 132 is retained against axial displacement off of the fuel line by an annular bead 136. It is, thus, seen that by turning the cap 132, the Venturi section 120 is drawn against the end of the fuel line and also against the rounded surface of the annular bead 136, whereby a secure fluid tight connection is obtained. The remaining portion of the Venturi 40 is provided by a Venturi section 138, which has a short cylindrical bore 140 having a diameter substantially equal to and in axial alignment with the short cylindrical bore 130. The bore 140 then merges with a diverging conical bore 142, which has a diameter at its larger downstream end substantially equal to the internal diameter of the fuel line 42. The fuel line 42 may be connected with a downstream end of the Venturi section 138 by means of a threaded cap 144, which threadedly engages external threads on the Venturi section 138, and which bears against an annular shoulder 146 on the end of the fuel line for drawing the end of the line tightly against the Venturi section.

I norder to join the two sections of the Venturi, the section 120 is provided with a reduced diameter portion 148 which is adapted to fit within a smoothly machined bore 150 in the end of the section 138. It should be noted that the Venturi sections are constructed so that a slit 152 is provided between the relatively small diameter cylindrical bore sections 130 and 140. The slit 152 communicates with an enlarged annular recess 154 so that the fluid pressure at the reduced diameter portion of the Venturi is measured at all points around the circumference of the fluid passageway. The fluid conduit 50 is connected with the annular passageway 154 through a radially extending passageway 156 in the Venturi section 138 for conveying fluid under pressure to the dashboard unit 26. The fluid conduit 48 is similarly connected with the Venturi section 120 by means of passageway 158 for conveying the fluid under the normal line pressure to the dashboard unit. With this improved Venturi, it is seen that by reason of the slit 152, the pressure of the fluid in the restricted passageway may be accurately measured with a minimum of error due to slight variations which might occur at various points around the passageway. Furthermore, since the slit completely surrounds the restricted passageway, eddy currents which might be caused by an opening on only one side of the passageway are eliminated. Furthermore, it is readily seen that the width of the slit can easily be made as narrow as desired whenever very short restricted passageways or throats are used.

Referring now to Figs. 12, 14, 15, and 16, the fluid responsive mechanism of the dashboard unit 26 will be described. This mechanism includes the unit body 72, which may be formed from one piece of any suitable metal. The body 72 is provided with an enlarged cavity 160, which is adapted to receive fuel under pressure conveyed from the gasoline line to the unit by the conduit 48. As shown best in Fig. 15, the conduit 48 passes upwardly through an opening 162 in the body 72 and then connects with a passageway 164 within the body 72, as at 166. The passageway 164 may be provided by drilling or otherwise forming the body member, and it extends through the body member for communicating with the cavity 160. The cavity 160 is covered by a cap 168, which is provided with an annular depending flange 170 which fits snugly within the annular upstanding flange 172 on the body member. Between the cap 168 and the body member, there is positioned a diaphragm 174 which has its marginal edges pressed between the cap and the body member. As shown best in Fig. 17, the peripheral edge of the diaphragm is provided with an annular flange 176 which registers with an annular recess 178 in the body member for providing a liquid tight seal. The diaphragm 174 thus divides the chamber provided by the cap 168 and the cavity 160 into separate upper chamber 180 and lower chamber 182. Fluid under pressure is conveyed to the upper chamber 180 by the conduit 50, which communicates with aligned bores 184 and 186 in the base member and cap, as shown in Fig. 14. Of course, an aperture aligned with these bores is provided in the marginal portion of the diaphragm. The cap 168 is further drilled by a passageway 188 which conveys the fluid from the bore 186 to substantially the mid point of the upper cavity 180.

It may be readily seen that when the fluid is conveyed to the upper and lower chambers 180 and 182 under differential pressures provided by the Venturi, the diaphragm 174 will be flexed up and down an amount directly proportional to the difference in the fluid pressures in the two chambers. The diaphragm may preferably be formed of substantially non-resilient plastic or artificial rubber or of cloth impregnated with these materials; and in order to increase the sensitivity in the diaphragm and to eliminate any spring rate action therein, the outer portions of the diaphragm are provided with a series of annular corrugations 190. In addition, the center portion of the diaphragm is held relatively rigid between a pair of washers 192 and 194, which are held together by a rivet 196. The rivet 196 is provided with a depending shank 198, which is connected to a lever mechanism more fully described below.

Figure 15:
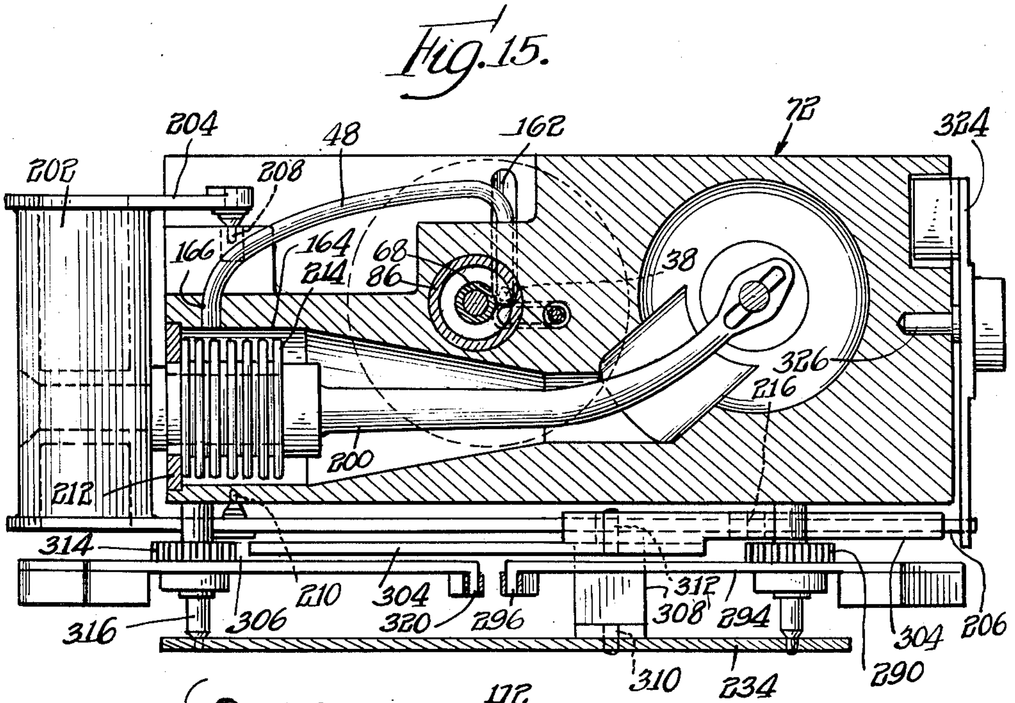
Fig. 15 is a partial horizontal cross sectional view taken along line 15—15 in Fig. 11.

A lever 200 extends into the body member 72 through the passageway 164 and into the lower chamber 182, as shown best in Figs. 12 and 15. The lever 200 is secured at its outer end to a pivotal base member 202, which is provided with arms 204 and 206 extending along opposite sides of the body member. The arms 204 and 206 are provided with short pins 208 and 210 for pivotally mounting the base member and the lever on the body member 72. The open end of the passageway 164 is substantially closed by a plug 212, which has a central aperture for receiving the lever 200. In order to seal hermetically the end of the passageway and prevent the possibility of gasoline escaping, a bellows 214 is provided which has one end secured to the lever 200 and its other end secured to the plug 212. The bellows thus provides a flexible seal which prevents any leakage while at the same time permitting the operation of the lever 200. The bellows preferably may be formed of substantially non-resilient plastic or artificial rubber to preclude spring rate action. Also it should be noted that the center lines of the pivot pins 208 and 210 extend across substantially the mid portion of the bellows 214, whereby motion and spring action of the bellows is reduced to a minimum thus permitting the use of a metal bellows in the event the greater safety factor thereof should be desired. Thus, the lever 200, which has its inner or free end secured to the diaphragm 174 through the pin or shank 198 will be actuated in response to the flexing movement of the diaphragm substantially free from any forces which might be applied to the lever by the bellows due to any spring action thereof, if the pivot point of the lever arm were otherwise disposed.

While the lever arm 204 is short and is only for the purpose of providing a pivotal mounting for the base member 202, the lever arm 206 is relatively long and extends for the full length of the base member 72 and slightly past the opposite end thereof from the pivotal mounting, as shown best in Fig. 15. Adjacent its free end, the lever arm 206 is provided with a knife edge 216. The knife edge 216 is for the purpose of engaging and actuating additional linkage mechanism, which is hereinafter more fully described.

Figure 6:
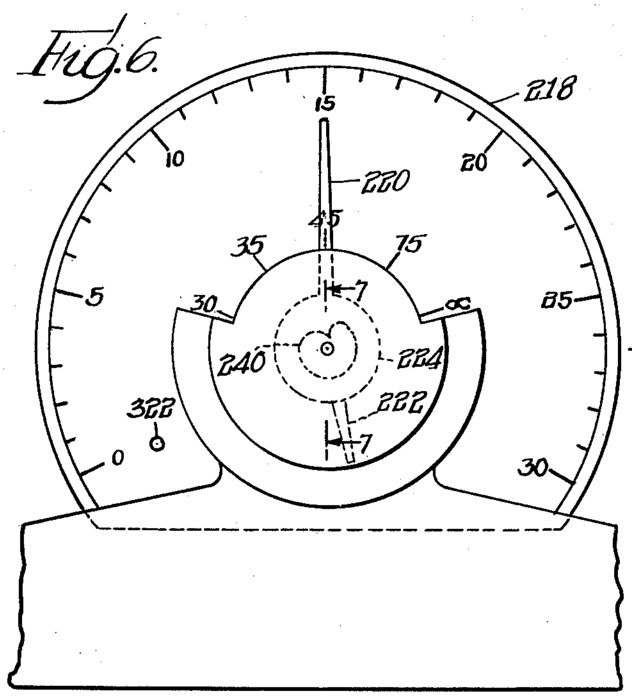
Fig. 6 is a front elevational view, showing the miles per gallon indicator and dial utilized by this invention.
Figure 7:
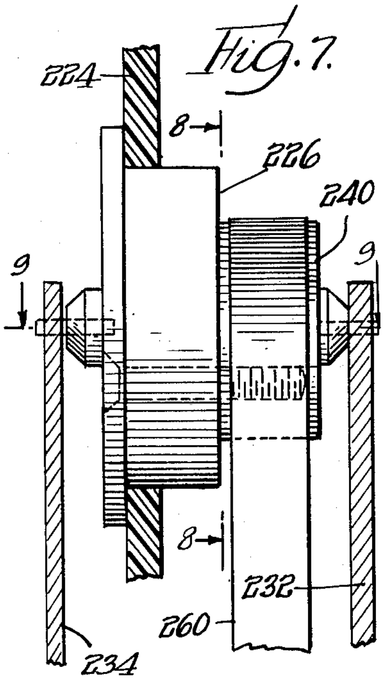
Fig. 7 is a fragmentary partial cross sectional view taken along line 7—7 in Fig. 6.
Figures 8, 9:
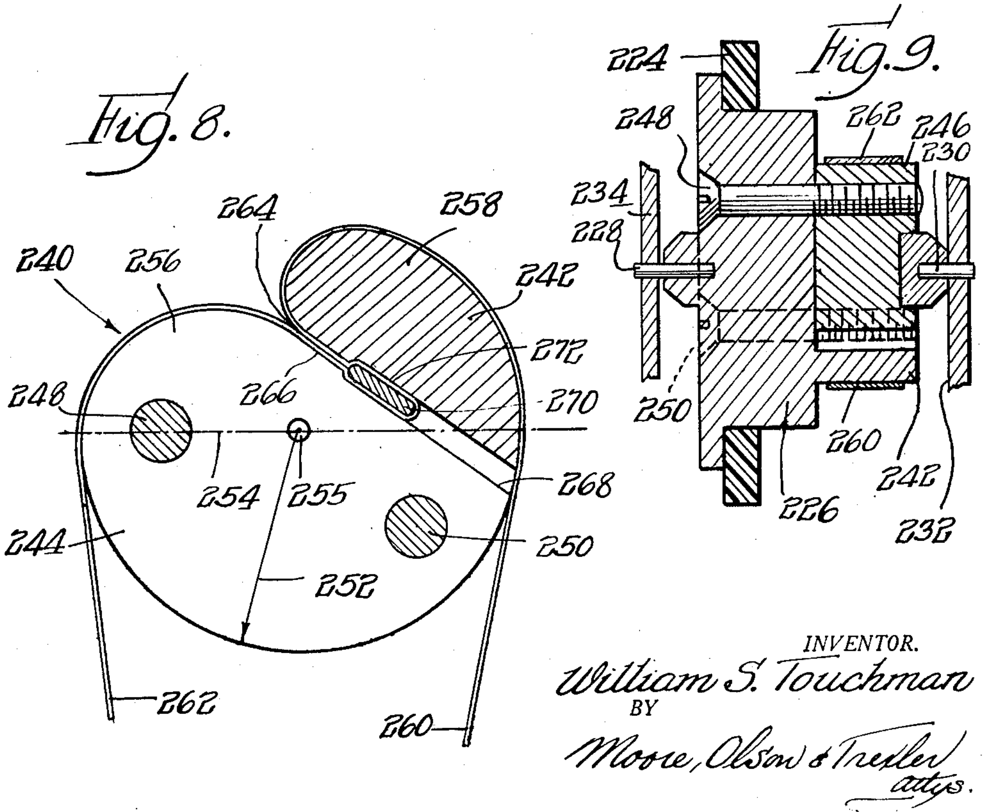
Fig. 8 is a fragmentary cross sectional view taken along line 8—8 in Fig. 7 and showing the novel cam provided by this invention for transmitting the lineal forces provided by the fuel flow and speed responsive devices to the indicator.
Fig. 9 is a fragmentary horizontal cross sectional view taken along line 9—9 in Fig. 7.
Figures 16, 17, 18:
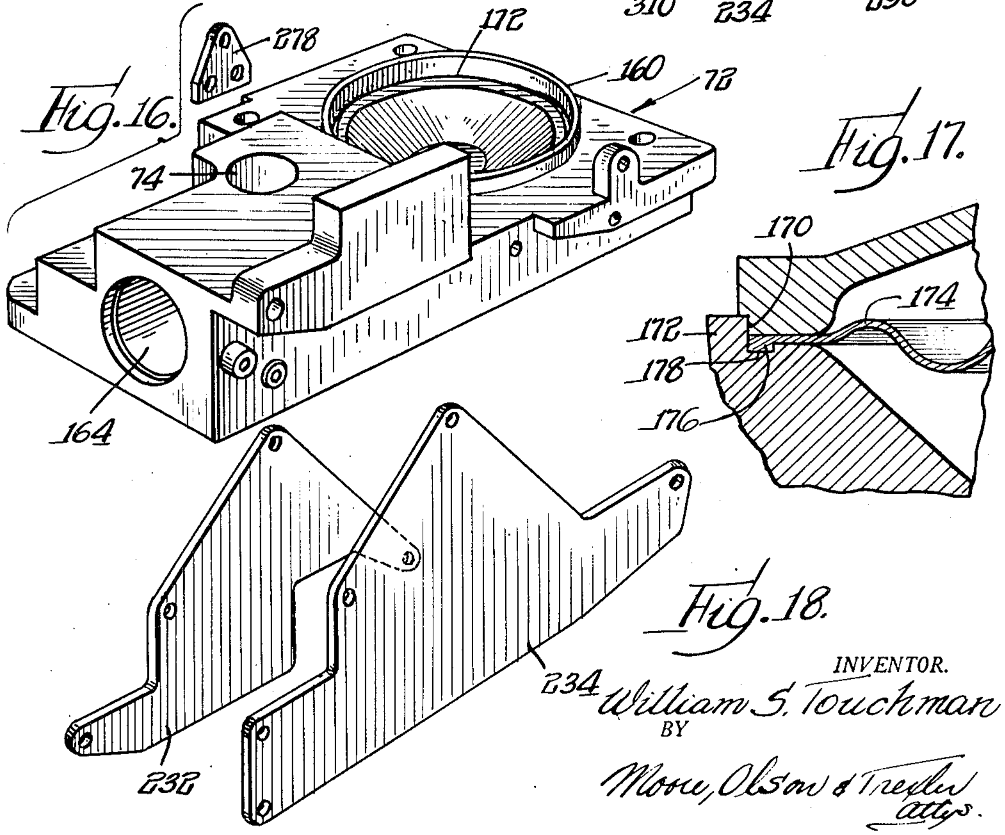
Fig. 16 is a perspective view, showing the body of the dashboard unit of this invention.
Fig. 17 is an enlarged cross sectional view, illustrating the novel means for mounting and sealing the pressure responsive diaphragm within the body of the dashboard unit.
Fig. 18 is a perspective view, showing the brackets for mounting the dial and indicator mechanism on the body of the dashboard unit.

Referring now more specifically to Figs. 6, 7, 8, 9, 11, and 13, wherein the miles per gallon indicator mechanism of the present invention is illustrated, it is seen that a dial 218 is mounted for cooperation with an indicator finger 220. It is seen in Fig. 6 that the dial is calibrated along its outer periphery in even increments to give readings from zero to thirty miles per gallon. By spacing the increments evenly, the dial is readily readable, and the scale from zero to thirty miles per gallon will satisfy most normal requirements for the present-day automobiles. A smaller scale having decreasing increments reading from thirty miles per gallon to infinity is marked on the dial adjacent the mid portion thereof and cooperates with a second shorter indicator finger 22 in a manner to be hereinafter described. The indicator fingers 220 and 222 are preferably formed from an integral piece of material and extend outwardly from a base 224 which is fixed on a rotatable drum 226. The drum 226 is pivotally mounted by means of pins 228 and 230 between brackets or frame members 232 and 234, as shown best in Figs. 7, 9, 10, and 13. The bracket members, which are illustrated by themselves in Fig. 18, are secured together by means of screws 236 and spacers 238. The brackets are also mounted to the front of the body member 72 by means of the same screws, as shown in Figs. 10 and 13.

An important feature of this invention resides in the novel cam means 240 by which the lineal forces provided by the above decsribed rotor mechanism and fluid responsive mechanism are transmitted and combined to move the indicator fingers to the proper position along the dial face. This cam is shown best in Fig. 8, wherein it is disposed in the position which will locate the indicator fingers as shown in Fig. 6. The cam 240 is constructed of two parts. The cam lobe 242 is preferably an integral extension from the drum 226. The remaining portion of the cam 244 is constructed from a separate block which is secured to the drum by means of screws 248 and 250. The cam is constructed with a substantially constant radius 252 between the radii formed by the generally horizontal center line 254 which extends through the center line of the pivot pins 228 and 230 at point 255. The upper lobes 256 and 258 are constructed so that the effective moment arms of the cam in respect to the force lines of the tapes 260 and 262 are such that the varying forces applied to the cam in response to changing speeds and fuel consumption will cause the cam to balance with the indicator fingers pointing to the correct miles per gallon increment on the dial. The exact shape of the lobes may be empirically determined in respect to the particular Venturi and centrifugal governor provided, and since the forces created by the fluid pressure responsive device and rotor mechanism vary in accordance with the square of the fluid flow and the square of the rotor speed, respectively, accuracy will be provided at all speeds and fuel consumption rates. The manner of generating the cam surfaces in respect to particular scale calibrations, is set forth in detail in my copending applications entitled "Gasoline Mileage Indicator," Serial No. 233,541, filed June 26, 1951; and "Calculating Device," Serial No. 316,888, filed October 25, 1952, to which reference may be made.

The forces are applied to the cam by means of a pair of flexible metal tapes 260 and 262 which encircle the cam and are effectively secured thereto at a common point 264. In order that the tapes may lie smoothly on all points along the surface of the cam, particularly at the points of effective connection, the tapes extend within a slot 266 which is provided between the two sections of the cam. This slot has an outer enlarged portion 268 which is adapted to receive a wedge 270. The tapes 260 and 262 are integrally joined to form a continuous tape which has a looped portion 272 surrounding the wedge 270. Thus, upon applying tension to the tapes, the wedge 270 is drawn tightly against the shoulders between the smaller slot 266 and the larger slot 268 to anchor securely the tapes to the cam.

The speed responsive and fuel flow responsive devices apply tension to the free ends of the tapes through the interconnecting linkage mechanism which will now be described. Referring more particularly to Figs. 10, 11, 12, and 13, it is seen that a rocker arm 274 is secured to a pair of crank arms 275 and 277, which arms are pivotally mounted to the bracket 232 by pin 276 and to a tab 278 by pin 280. The tab 278 may be secured to the body member 72 in any suitable manner. An arm 282 fixed to the rocker bar 274 extends therefrom and is bent downwardly so that the lower end of the arm is in substantial alignment with the aperture 118 in the rotor cap 110. A ball 284 is secured to the lower end of the arm 282 and extends through the rotor cover for engagement with the rotor weight actuated button 106. It is readily seen that as the button 106 is raised and lowered by the weights 94, the rocker arm will be pivoted back and forth. The rocker arm 274 and its associated elements are best illustrated by themselves in Fig. 20.

Secured to the lower end of the crank arm 275 and below the pivot pin 276 is a block 286 having a gear segment 288 formed thereon. Upon rocking motion of the arm 274 and the crank arm 275, the gear segment 288 actuates a cooperating gear 290, which gear is secured to a shaft 292. A crank arm 294 is secured to the same shaft 292 for movement therewith upon actuation by the gear and gear segment. The crank arm 294 terminates at one end in a drum segment 296 over which the lower end of the cam actuating tape 260 passes. The tape 260 is secured to the crank arm in the manner best shown in Fig. 11. It is seen that the tape 260 is passed under the lower edge of the drum segment 296 and upwardly along the rear surface thereof. The terminal end of the tape 260 is formed with a loop 298 into which a wedge 300 is inserted. A pin 302 is secured to the crank arm 294 and is spaced from the drum head a distance sufficient to enable one thickness of the tape 260 to pass therebetween so that the enlargement formed at the end of the tape by the loop and the wedge will be wedged between the pin and the drum head.

The mechanism for applying forces to the cam in response to the fluid pressures which cause flexing of the diaphragm 190 of the pressure responsive device is shown best in Figs. 10, 11, 12, 13, and 15. As was described above, the lever arm carrying the knife blade 216 is actuated by flexing the diaphragm through the lever 200 and common base 202. The knife edge 216 contacts one end of the lever 304 which is provided at its opposite end with a gear segment 306. As shown best in Fig. 23, the lever 304 is provided with an integral bracket 308 at a mid portion thereof, which bracket includes aligned apertures adapted to receive pins for pivotally mounting the lever. Suitable pins, such as pins 310 and 312, pivotally support the lever 304 between the spaced bracket members 232 and 234, as shown in Fig. 15.

The gear segment 306 is adapted to cooperate with a gear 314 fixed to a shaft 316. On the same shaft, there is mounted a crank arm 318 which is identical to the above described crank arm 294 and which includes a drum sector 320 at its inner end. The flexible tape 262 is secured to the crank arm 318 in the same manner as the tape 260 is secured to the crank arm 294.

The operation of the above described miles per gallon indicator is as follows. If the engine of the automobile is running, the fluid fuel passing through the fuel line and through the Venturi 40 has its operating pressures within the Venturi transmitted through the pressure lines 48 and 50 at different pressures. The fuel is conveyed by these lines, or more properly speaking has its operating pressures transmitted therethrough, into the upper and lower chambers 180 and 182, where the differential pressure causes the diaphragm to flex. This flexing of the diaphragm operates the lever 200 and the lever 206 to actuate the linkage described above to exert a downward pull on the flexible tape 262. This pull tends to rotate the cam 240 in a counterclockwise direction to move the indicator finger toward a reading of zero miles per gallon. At the same time, however, the centrifugal force of the rotating rotor mechanism tends to cause the weights 94 to assume a horizontal position. This action raises the arms 96 and the button 106, thereby to actuate the rocker arm 274. Upon rotation of the rocker arm 274, the gear segment 288 interconnected therewith operates the linkage mechanism to cause a downward pull to be exerted on the flexible metal tape 260. This downward pull on the tape 260 tends to cause the cam to rotate in a clockwise direction. The cam is constructed so that the force exerted on the tape 260 for a particular rotor speed and the force exerted on the tape 262 for a particular fuel flow will balance each other when the indicator finger is at the correct dial reading. In the particular embodiment illustrated, the cam has been constructed so that the effective lever arms to which the forces are applied by the tapes 260 and 262 are substantially equal when the cam has been rotated to move the indicator finger 220 to a reading of fifteen miles per gallon. At this reading, it is seen that the forces applied to the tapes will be substantially equal. If for example the rotor speed decreases while the fuel consumption remains constant, the force applied by the tape 260 will decrease, and the relatively greater force applied by the tape 262 causes the cam to rotate in a counterclockwise direction. Since the effective lever arm of the cam to which the tape 262 is applied decreases as the cam rotates in a counterclockwise direction, the cam will again balance at a lower miles per gallon reading when the cam has been rotated to a point where the shorter lever arm times the force applied by the tape 262 again equals the value of the force applied by the tape 260 times the substantially constant lever arm to which it is applied. If, on the other hand, the rotor speed increases relative to the fuel consumption, the cam will be rotated in a clockwise direction until the forces again become balanced.

It should be noted that the large outer dial has been calibrated to read from zero to thirty miles per gallon. This range will satisfy the requirements of normal driving of most automobiles. However, in certain situations, when the fuel consumption is very low, such as when an automobile is coasting down a hill with the engine idling, the miles per gallon being obtained will be greater than thirty, and, therefore, the inner calibrations on the dial have been provided to cooperate with the short indicator finger 222. In such a case, it is seen that the force applied by the tape 262 will be practically zero, whereby the force applied by the tape 260 will rotate the cam substantially 360°, or until the relatively long finger engages the stop pin 322 extending from the face of the dial.

In order to fill initially the fluid chambers 180 and 182 or to eliminate any air pockets therein, means for priming the chambers is provided. This means includes a lever 324 shown in Fig. 21, which lever is pivotally mounted to the end of the body member 72 by a pin 326, as shown in Figs. 15 and 16. One end of the lever 324 extends over the free end of the lever 206, as shown in Fig. 15. By manipulating the lever 324, the lever 206 and the interconnected lever 200 are actuated to flex the diaphragm up and down in a pumping action, whereby the chambers 180 and 182 may be completely filled with liquid. It should be noted that the lever 206 may be actuated without operating the remaining portion of the linkage, whereby the chambers may be primed without actuating the indicator mechanism, thereby providing for easier priming and a reduction in the wear and tear on the apparatus.

It should be noted that all of the above described levers and crank arms of the linkage mechanisms are weighted so that they are statically balanced at all positions. Also, the drum sectors 296 and 320 maintain a constant position for the lower ends of the tape reaches, regardless of tape stretch or linkage adjustment. The tapes, which may be of steel, are highly flexible in relation to their strength. This, of course, insures that only the forces created by the rotor and the fluid responsive device actuate the indicator mechanism and linkage variations are eliminated so that the engine efficiency is accurately recorded. All lines and passages connected with the fuel are hermetically sealed so that there is no fire hazard. At the same time provision is made to readily maintain the fuel lines and chambers filled. Spring rate in the parts is eliminated.

While the above apparatus has been described for particular use as a miles per gallon indicator with an automobile, it is obvious that it may be applied for various other uses. For example, the apparatus may be used in a boat. Such a use is schematically illustrated in Fig. 5.

The only difference in this application is that the flexible drive shaft 38 for driving the rotor mechanism is connected with a log 328 which is suspended in the water in the usual manner and driven by its movement through the water at a rate proportional to the boat speed.

While a preferred embodiment of the present invention has been shown and described herein, it is obvious that numerous changes may be made in the structural details of the novel miles per gallon indicator apparatus without departing from the spirit and scope of the appended claims.

I claim:

1. In an engine efficiency meter, the combination comprising a rotor member, at least three weight members equally circumferentially spaced about and mounted on said rotor member and normally extending at an acute angle to the axis of rotation of said rotor member, axle means for pivotally mounting each of said weight members on said rotor member, a plurality of levers respectively rigidly connected with said weight members and extending generally radially inwardly, a member freely supported by inner ends of said levers, pivot members respectively connecting the inner ends of said levers with said freely supported member, each of said pivot members being disposed radially with respect to the rotor member axis, each of said axle means having portions thereof freely disposed within recess means in one of said members, said recess means having dimensions greater than said portions of said axle means and partially defined by an elongated substantially flat bearing surface means extending radially of said rotor member to provide reduced frictional contact between said portions of said axle means and surfaces of said recess means and to permit said axial portions to shift along said flat bearing surface means upon pivotal movement of the weight members and levers under the influence of centrifugal force, means for driving said rotor member in response to engine performance, said weight members being movable by centrifugal force upon driving said rotor member to create a force on said freely supported member, means responsive to fuel flow through an engine fuel line for creating a force substantially proportional to the square of the fuel flow, and means for combining the forces created by the functioning of said fuel flow responsive means and the functioning of said weight members to indicate engine efficiency.

2. An engine efficiency meter, as defined in claim 1, which includes anti-friction bearing means for rotatably supporting said rotor to provide for smooth and efficient operation, particularly at low rotor member speeds.

3. An engine efficiency meter, as defined in claim 1, wherein said means for driving said rotor includes means for driving the rotor at a higher speed than the engine speed to increase the sensitivity of the weight members at relatively low engine speeds.

4. In an engine efficiency meter, the combination comprising a fluid chamber, means for conducting fluid into said chamber at different pressures in accordance with fuel flow through an engine fuel line, means responsive to the differential fluid pressure, a linkage member connected with said pressure responsive means and positively movable therewith, in opposite directions, means responsive to engine performance, indicator means, means interconnecting said indicator means and said engine performance responsive means, means including a shiftable member interconnected with said indicator means and freely engaging and actuatable by said linkage member, said indicator means including means for combining the functioning of said engine responsive means and said pressure responsive means to indicate engine efficiency, and said linkage member having an extending portion for manual operation thereof independently of the shiftable member actuatable thereby for actuating said pressure responsive means to prime said chamber with fluid.

5. In an engine efficiency meter, the combination comprising means responsive to fuel flow through an engine fuel line, said means including a rotatable member having a drum sector, means responsive to engine performance, said last mentioned means also including a rotatable member having a drum sector, means including a rotatably mounted cam for combining the functioning of said fuel flow and engine responsive means to indicate engine efficiency, a flexible element having one end overlying the drum sector of and secured to one of said rotatable members and having the other end secured to said cam for applying a force in one direction to the cam, and a second flexible element having one end overlying the drum sector of and secured to the other of said rotatable members and having the other end secured to said cam for applying a force in an opposed direction to the cam, said cam being of such shape so that the forces applied thereto are combined to move the indicator means to indicate the engine efficiency.

6. An engine efficiency meter as defined in claim 5, wherein the axis of each rotatable drum sector is normal to the point of engagement between the drum sector and the flexible element, whereby the flexible element extends tangentially from the drum sector in its various adjusted positions.

7. In an engine efficiency meter, the combination comprising means responsive to fuel flow through an engine fuel line, means responsive to engine performance, means for combining the functioning of said fuel flow and engine responsive means to indicate engine efficiency, said indicator means including a cam, a flexible element connecting said cam and said fuel flow responsive means for applying a force to said cam in one direction, a second flexible element connecting said cam and said engine responsive means for applying a force to said cam in an opposed direction, said cam being of such shape that the forces applied thereto are combined to move the indicator means to indicate the engine efficiency, said cam having a recess therein adapted to receive the ends of said flexible elements, and means for securing the ends of said flexible elements within said recess.

8. In an engine efficiency meter, the combination comprising means responsive to fuel flow through an engine fuel line, means responsive to engine performance, means for combining the functioning of said fuel flow and engine responsive means to indicate engine efficiency, said indicator means including a cam, a flexible element connecting said cam and said fuel flow responsive means for applying a force to said cam in one direction, a second flexible element connecting said cam and said engine responsive means for applying a force to said cam in an opposed direction, said cam being of such shape that the forces applied thereto are combined to move the indicator means to indicate the engine efficiency, and means for anchoring at least one end of each of said flexible elements comprising a loop formed at the end of the flexible element, an anchor piece disposed within the loop, and a restricted passageway blocking movement of the anchor member in the direction of extension of said flexible element.

9. In an engine efficiency meter, the combination comprising a body member having a chamber therein, means for introducing fluid under different pressures in accordance with fuel flow through an engine fuel line into different portions of said chamber, means in said chamber responsive to the differential fluid pressure therein, a linkage member extending through an opening in said body member interconnected with said pressure responsive means in said chamber, an elongated flexible bellows surrounding said linkage member and having one end secured to said linkage member within said chamber and the other end secured about the periphery of said opening for hermetically sealing said opening, reversely extending support means rigidly connected with and extending from a portion of said linkage member outside of said chamber and generally parallel to the portion of the linkage member enclosed by said bellows, means disposed outside of said chamber and pivotally mounting said linkage member support means for movement about an axis extending transversely through a mid portion of said elongated bellows to reduce any spring action of the bellows on the linkage member, means responsive to engine performance, and means for combining the functioning of said linkage member and said engine responsive means to indicate engine efficiency.

10. In an engine efficiency meter, the combination comprising a body member having a chamber therein, means for introducing fluid under different pressures in accordance with fuel flow through an engine fuel line into different portions of said chamber, means in said chamber responsive to the differential fluid pressure therein, a linkage member extending through an opening in said body member interconnected with said pressure responsive means in said chamber, an elongated flexible bellows surrounding said linkage member and having one end secured to said linkage member within the chamber and the other end secured about the periphery of said opening for hermetically sealing said opening, reversely extending support means rigidly connected with and extending from a portion of said linkage member outside of said chamber and generally parallel to the portion of the linkage member enclosed by said hellows, and means disposed outside of said chamber and pivotally mounting said linkage member support means for movement about an axis extending transversely through a mid portion of said elongated bellows to reduce any spring action of the bellows on the linkage member.

11. In an engine efficiency meter, means for creating a force in response to engine performance, said means including the combination of an upstanding rotor member, having a plurality of equally spaced radially extending slots in an upper side thereof, a plurality of weight members respectively disposed in said slots, axle means pivotally mounting each of said weight members on said rotor member, each of said axle means having portions thereof freely disposed within recess means in walls of said slots, said recess means having dimensions greater than said portions of the axle means to reduce frictional contact between said axle means portions and surfaces of said recess means, lever means rigid with and extending inwardly from each of said weight members, means positively interconnecting inner ends of said lever means, means for driving said rotor member in response to engine performance, said weight members being movable by centrifugal force to create a force applied to said lever interconnecting means, and a sheet material cover on said rotor member and overlying said lever means, said cover including spring retaining fingers snapped beneath said rotor member, and said cover having an aperture aligned with said lever means interconnecting means to permit engagement thereof by means to be actuated.

12. In an engine efficiency meter, the combination comprising rotor means, means for driving said rotor means in accordance with engine performance, a plurality of weight members disposed around the periphery of said rotor means and normally extending at an acute angle to the axis of rotation of said rotor means, axle means pivotally mounting each of said weight members, each of said axle means having a portion thereof freely disposed within recess means in said rotor means, each of said recess means having an elongated substantially flat bearing surface extending generally radially of said rotor means a distance substantially greater than the diameter of said axle means portion to permit radial shifting of the weight members, said weight members being movable by centrifugal force toward positions extending substantially normal to said axis of rotation, lever means rigid with and extending inwardly from each of said weight members for exerting a force in response to the movement of the weight members, and a force transmitting member supported only by and pivotally interconnected with inner ends of said lever means.

References Cited in the file of this patent

UNITED STATES PATENTS

| | | |
|---|---|---|
| 742,874 | Junggren | Nov. 3, 1903 |
| 1,503,552 | Parker | Aug. 5, 1924 |
| 1,850,030 | Pardoe | Mar. 12, 1932 |
| 2,260,766 | Bjong | Oct. 28, 1944 |
| 2,385,382 | Samiran | Sept. 25, 1945 |
| 2,395,042 | Flatt | Feb. 19, 1946 |
| 2,454,946 | Rosenberger | Nov. 30, 1948 |
| 2,522,299 | Redue | Sept. 12, 1950 |
| 2,604,116 | Bailey | July 22, 1952 |
| 2,646,978 | Barnes | July 28, 1953 |